(12) United States Patent
Saito

(10) Patent No.: US 9,097,402 B2
(45) Date of Patent: Aug. 4, 2015

(54) VEHICLE LAMP WITH ELONGATED COVER AND A LIGHT DIFFUSIVE PORTION

(71) Applicant: Junichi Saito, Shizuoka (JP)

(72) Inventor: Junichi Saito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 46 days.

(21) Appl. No.: 13/798,357

(22) Filed: Mar. 13, 2013

(65) Prior Publication Data

US 2013/0258698 A1    Oct. 3, 2013

(30) Foreign Application Priority Data

Mar. 29, 2012 (JP) ................. 2012-076279

(51) Int. Cl.
*F21V 5/02* (2006.01)
*B60Q 1/00* (2006.01)
*F21S 8/10* (2006.01)

(52) U.S. Cl.
CPC ............... *F21V 5/02* (2013.01); *B60Q 1/0047* (2013.01); *F21S 48/215* (2013.01); *F21S 48/2212* (2013.01); *F21S 48/2237* (2013.01); *F21S 48/2268* (2013.01); *F21S 48/2287* (2013.01); *F21S 48/25* (2013.01)

(58) Field of Classification Search
CPC .. B60Q 1/32; F21W 2101/02; F21Y 2103/00; F21Y 2013/003; F21S 4/008; F21S 8/10; F21S 8/12; F21V 5/002; F21V 5/004; F21V 5/005; F21V 3/0445
See application file for complete search history.

(56) References Cited

U.S. PATENT DOCUMENTS 3,210,875 A * 10/1965 Schwenkler ................... 40/589

FOREIGN PATENT DOCUMENTS

JP          2011003281 A      1/2011

OTHER PUBLICATIONS

Patent Abstracts of Japan, Publication No. 2011-003281; Publication Date: Jan. 6, 2011 (1 Page).

* cited by examiner

*Primary Examiner* — Ismael Negron
(74) *Attorney, Agent, or Firm* — Osha Liang LLP

(57) ABSTRACT

A vehicle lamp includes a light emitting portion, a lamp body configured to accommodate therein the light emitting portion having an elongated shape, and a transparent cover configured to cover an opening portion in the lamp body. The transparent cover includes a main light exit surface portion positioned in front of the light emitting portion, an auxiliary light exit surface portion inclined with respect to the main light exit surface portion, the auxiliary light exit surface having a fixing portion configured to fix the transparent cover and the lamp body together, and a light diffusive portion formed on at least the periphery of a portion of the auxiliary light exit surface portion where the fixing portion is provided.

9 Claims, 3 Drawing Sheets

VEHICLE LAMP WITH ELONGATED COVER AND A LIGHT DIFFUSIVE PORTION

CROSS-REFERENCE TO RELATED APPLICATION(S)

The present application claims the benefit of priority of Japanese Patent Application No. 2012-076279, filed on Mar. 29, 2012. The disclosures of the application are incorporated herein by reference.

BACKGROUND

1. Technical Field

The present invention relates to a vehicle lamp.

2. Related Art

A combination headlamp is known in which a low beam lamp, a high beam lamp and a clearance lamp are integrally built in a lamp chamber. In a combination headlamp like this, for example, a projector-type or reflector-type lamp is used for low beam and high beam lamps. In addition, it has been practice to use a reflector-type lamp for a clearance lamp. In recent years, however, a clearance lamp using a light guiding member is proposed in which light emitted from a light source made up, for example, of an LED is caused to enter the light guiding member from one end face and is then emitted to the outside of the light guiding member while being guided in an interior thereof (refer, for example, to Patent Literature 1 for a vehicle lamp using a light guiding member).

PRIOR ART LITERATURE

Patent Literature

Patent Literature 1 JP-A-2011-3281

Normally, in a vehicle lamp using a light guiding member, the light guiding member is disposed in a lamp chamber which is defined by a lamp body and a transparent cover. When the lamp body and the transparent cover are fixed together by using a fixing portion such a lance, since the cover is transparent, the fixing portion becomes visible from the outside of the lamp, leaving room for improvement in terms of external appearance.

SUMMARY

Exemplary embodiments of the invention provide a vehicle lamp in which its external appearance is increased.

A vehicle lamp according to an exemplary embodiment of the invention includes:
  a light emitting portion having an elongated shape;
  a lamp body configured to accommodate therein the light emitting portion; and
  a transparent cover configured to cover an opening portion in the lamp body, the transparent cover comprising
    a main light exit surface portion positioned in front of the light emitting portion,
    an auxiliary light exit surface portion inclined with respect to the main light exit surface portion, the auxiliary light exit surface having a fixing portion configured to fix the transparent cover and the lamp body together, and
    a light diffusive portion formed on at least the periphery of a portion of the auxiliary light exit surface portion where the fixing portion is provided.

According to the exemplary embodiment of the invention, since the light diffusive portion is formed on at least the periphery of a portion of the auxiliary light exit surface portion where the fixing portion is provided, it can be made difficult to see the fixing portion and thus it is possible to increase the external appearance of the vehicle lamp.

The light diffusive portion may have a plurality of cylindrical steps.

The transparent cover may further comprise a light diffusive portion formed on the main light exit surface portion, and the light diffusive portion formed on the main light exit surface portion and the light diffusive portion formed on the auxiliary light exit surface portion may have different shapes.

The transparent cover may further comprise a light diffusive portion formed on the main light exit surface portion, and the light diffusive portions on the main light exit surface portion may have a plurality of steps arranged in a lattice manner.

According to the exemplary embodiments of the invention, it is possible to increase the external appearance of the vehicle lamp.

DETAILED DESCRIPTION

Hereinafter, an exemplary embodiment will be described in detail by reference to the drawings.

Figure 1:
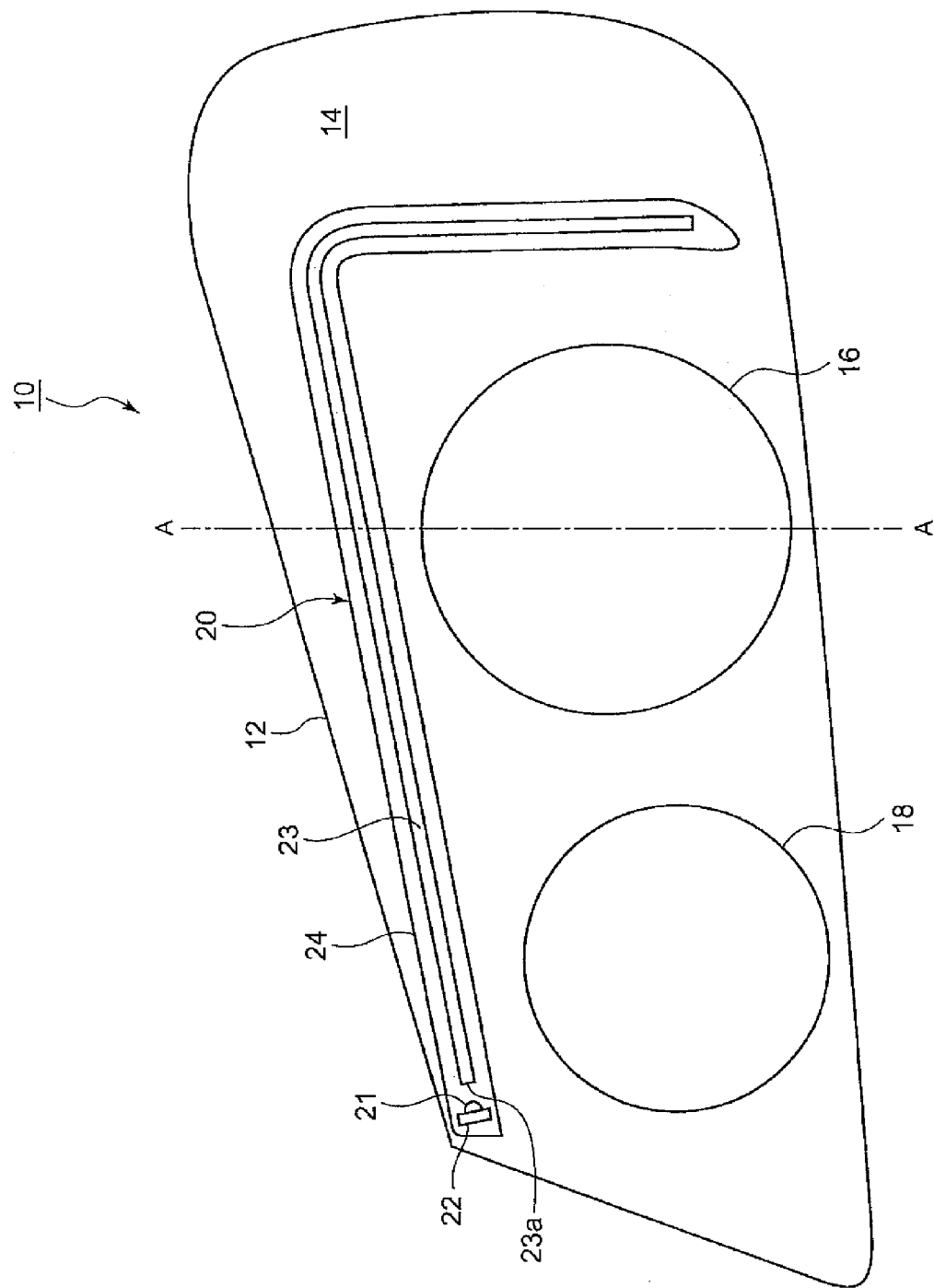
FIG. 1 is a schematic front view of a vehicle headlamp according to an embodiment of the invention.
Figure 2:
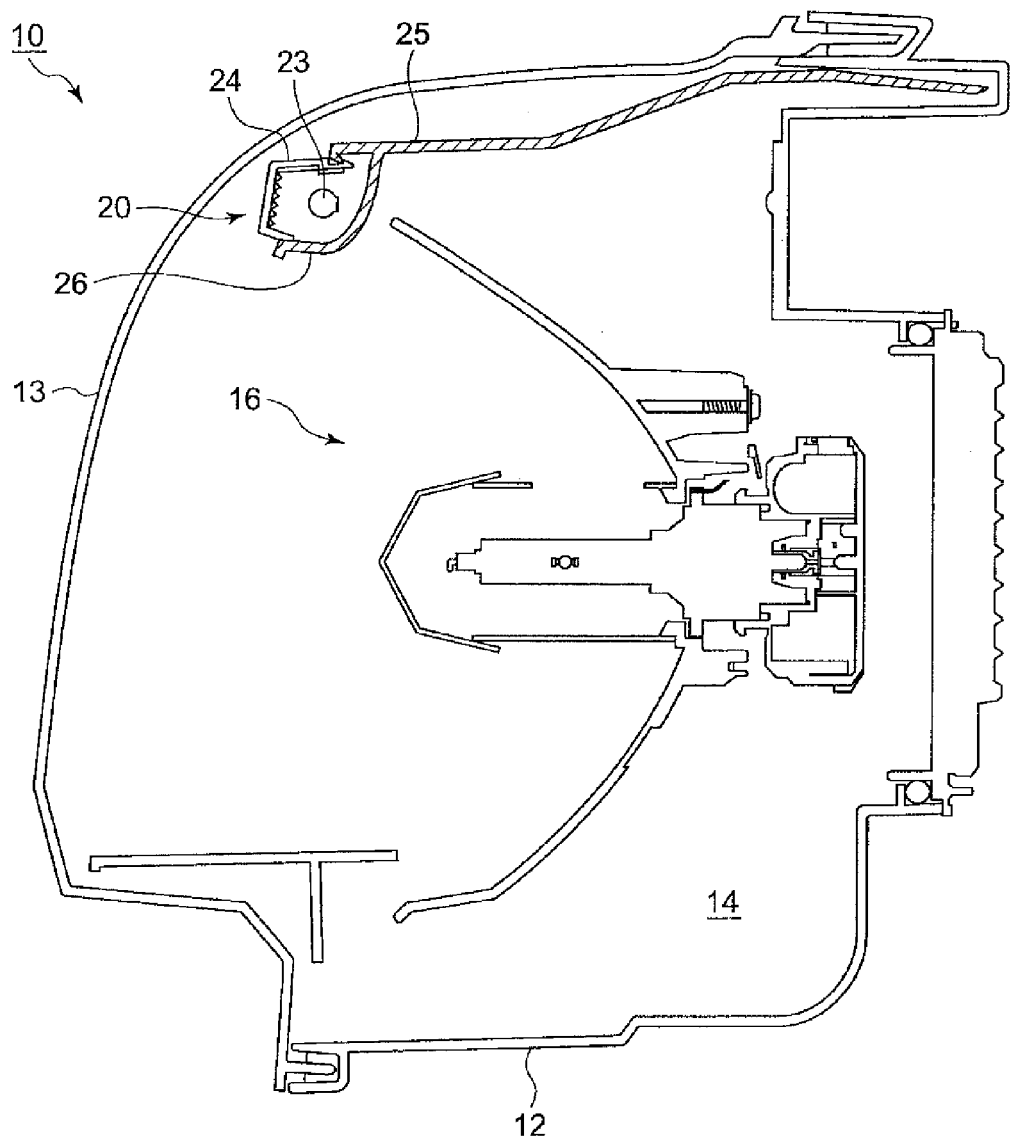
FIG. 2 is a sectional view of the vehicle headlamp taken along the line A-A in FIG. 1.

FIG. 1 is a schematic front view of a vehicle headlamp 10 according to an embodiment of the invention. FIG. 2 is a sectional view of the vehicle headlamp 10 taken along the line A-A in FIG. 1.

As shown in FIGS. 1 and 2, the vehicle headlamp 10 is a combination headlamp in which a low beam lamp 16, a high beam lamp 18 and a clearance lamp 20 are accommodated within a lamp chamber 14 which is defined by a lamp body 12 and a transparent cover 13.

The low beam lamp 16 and the high beam lamp 18 are disposed so as to be aligned side by side in a widthwise or transverse direction of a vehicle in the lamp chamber 14. In FIG. 2, although a reflector-type lamp is shown as the low beam lamp 16, there is imposed no specific limitation on the type of the low beam lamp 16, and hence, for example, a reflector-type or projector-type vehicle lamp can be used. A reflector-type low beam is known, and therefore, the detailed description thereof will be omitted here. There is also imposed no specific limitation on the type of the high beam lamp 18, and hence, for example, a reflector-type or projector-type vehicle lamp can be used.

As shown in FIGS. 1 and 2, the clearance lamp 20 includes an LED 21, a substrate 22 on which the LED 21 is mounted, a light guiding member 23 which functions as a light emitting portion having an elongated shape, a transparent cover 24 and an extension 25.

The light guiding member 23 is a rod-shaped member which is injection molded from a transparent resin such as acryl or polycarbonate. In FIG. 1, the light guiding member 23 has an L shape and extends substantially into an L shape from an upper edge portion to a transverse side edge portion of the lamp body 12. One end face of the light guiding member 23 is made into a light entrance surface 23a from which light from the LED 21 enters. The light guiding member 23 is formed so that light that enters from the light entrance surface 23a is emitted forwards from a light exit surface which is defined along a direction in which the light guiding member 23 extends while being guided in an interior of the light guiding member 23.

The LED 21 is a light source which provides the light guiding member 23 with light. The LED 21 is mounted on the substrate 22 so as to face oppositely the light entrance surface 23a of the light guiding member 23.

The extension 25 is a molded member molded from a resin and having a surface which is deposited with aluminum and is provided to conceal a gap between the low beam lamp 16 and the high beam lamp 18 and the lamp body 12. As shown in FIG. 2, a front end portion of the extension 25 is formed into a front opened receptacle which functions as a lamp body of the clearance lamp 20 in which the light guiding member 23 can be accommodated (hereinafter, referred to as a "clearance lamp body 26"). A transparent cover 24 is provided so as to cover the front opening portion of the clearance lamp body 26. The transparent cover 24 and the clearance lamp body 26 are formed so as to extend along the shape of the light guiding member 23.

Figure 3:
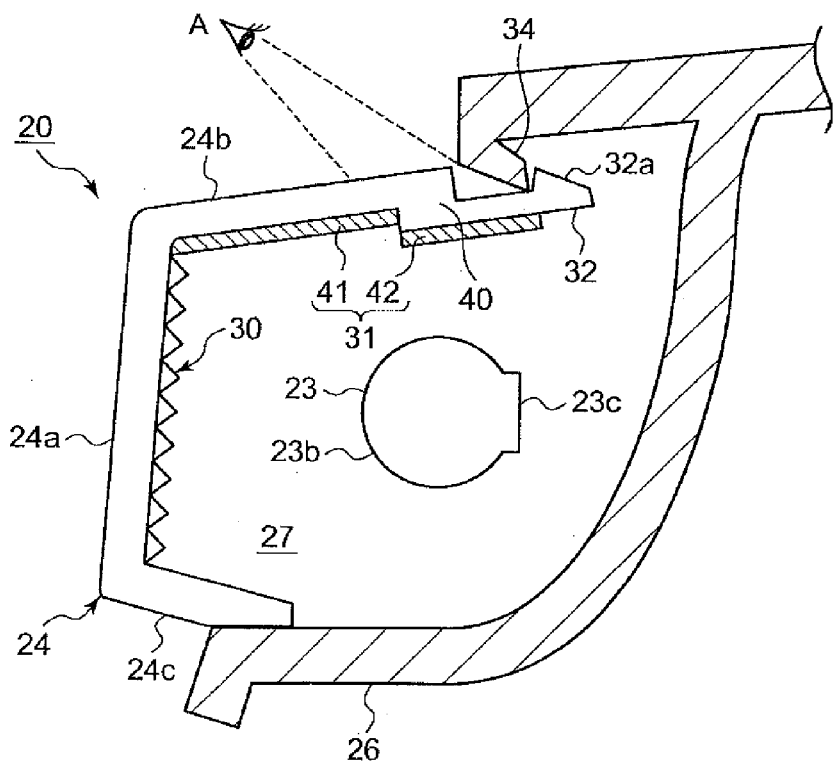
FIG. 3 is an enlarged sectional view of a clearance lamp.

FIG. 3 is an enlarged sectional view of the clearance lamp 20. As shown in FIG. 3, the light guiding member 23 is positioned and held substantially at the center of a lamp chamber 27 defined by the transparent cover 24 and the clearance lamp body 26. As shown in FIG. 3, the light guiding member 23 has a substantially circular cross section.

In this embodiment, a front side portion of a circumference of the light guiding member 23 functions as a light exit surface 23b from which light is emitted to the front of the lamp. Additionally, a plurality of steps 23c are formed on a rear side portion of the circumference of the light guiding member 23 along the extending direction of the light guiding member 23 so that part of light traveling in the light guiding member 23 is reflected towards the light exit surface 23b. The shape and size of the steps 23c and intervals at which they are arranged are designed so that light having an intensity required by the clearance lamp is emitted in a front direction (to the front) from the light exit surface 23b.

As shown in FIG. 3, the transparent cover 24 is formed into a concave shape and includes a main light exit surface portion 24a which is positioned in front of the light exit surface 23b of the light guiding member 23, a first auxiliary light exit surface portion 24b which is positioned above the light guiding member 23 and a second auxiliary light exit surface portion 24c which is positioned below the light guiding member 23. The first auxiliary light exit surface portion 24b is inclined at a first predetermined angle relative to the main light exit surface portion 24a and is in engagement with an upper end portion of the clearance lamp body 26. The second auxiliary light exit surface portion 24c is inclined at a second predetermined angle relative to the main light exit surface portion 24a and is in engagement with a lower end portion of the clearance lamp body 26. In this way, in this embodiment, the transparent cover 24 includes mainly the three surface portions and represents an external design of the clearance lamp 20. Normally, a light guiding member having a circular cross section is used as the light guiding member 23. However, as in this embodiment, in case a transparent cover having a plurality of surface portions as the transparent cover 24 which covers the light guiding member 23, an external appearance as it were a prism emits light can be realized inexpensively.

Since the main light exit surface portion 24a is positioned in front of the light exit surface 23b of the light guiding member 23, light having a high intensity enters the main light exit surface portion 24a from the light guiding member 23. Consequently, most of light which specifies the light distribution of the clearance lamp 20 exits from the main light exit surface portion 24a. A first light diffusive portion 30 is formed on an inner surface of the main light exit surface portion 24a so as to achieve a light distribution pattern required by the clearance lamp 20. In this embodiment, when viewed from the front thereof, the first light diffusive portion 30 has a plurality of steps arranged in a lattice manner. These steps can be regarded as steps for controlling light distribution.

The first auxiliary light exit surface portion 24b is formed so as to extend from an upper end portion of the main light exit surface portion 24a to the rear of the lamp. Part of light emitted from the light guiding member 23 is allowed to exit from the first auxiliary light exit surface portion 24b. The first auxiliary light exit surface portion 24b has a fixing lance 32 at a rear end portion of the first auxiliary light exit surface portion 24b, and the transparent cover 24 is fixed to the clearance lamp body 26 by this fixing lance 32.

Figure 4:
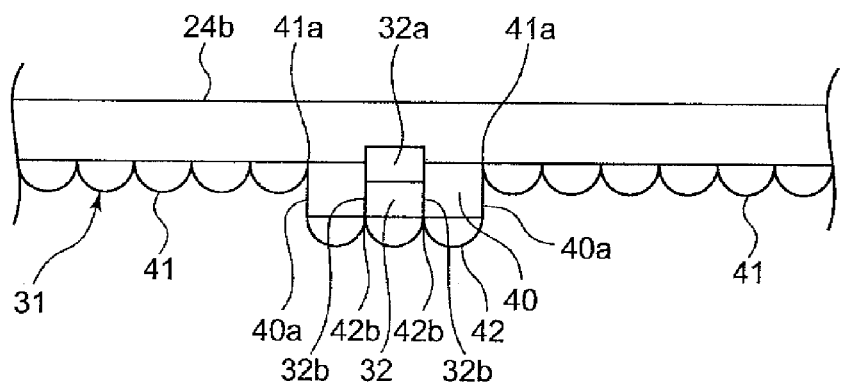
FIG. 4 is a view of the periphery of a fixing lance as seen from the rear of the clearance lamp.

FIG. 4 is a view of the periphery of the fixing lance 32 as seen from the rear of the clearance lamp. As shown in FIGS. 3 and 4, the first auxiliary light exit surface portion 24b has a thicker portion 40 at a part of the rear end portion of the first auxiliary light exit surface portion 24b, and this thicker portion 40 is formed thicker than other portions of the first auxiliary light exit surface portion 24b. The fixing lance 32 extends from this thicker portion 40 towards the rear of the lamp. A claw portion 32a is formed on the fixing lance 32, and this claw portion 32a is brought into engagement with an engagement portion 34 formed on the clearance lamp body 26, whereby the transparent cover 24 is fixed to the clearance lamp body 26.

Here, in this embodiment, as shown in FIGS. 3 and 4, a second light diffusive portion 31 is formed on an inner surface of the first auxiliary light exit surface portion 24b. In this embodiment, the second light diffusive portion 31 includes a plurality of cylindrical steps 41 which are formed on the inner surface of the first auxiliary light exit surface portion 24b excluding a portion where the thicker portion 40 is formed and a plurality of cylindrical steps 42 which are formed on an inner surface of the thicker portion 40. The pluralities of cylindrical steps 41, 42 are aligned along the extending direction (the longitudinal direction) of the clearance lamp 20. These cylindrical steps 41, 42 are advantageous in molding the transparent cover 24 using a mold because they can facilitate the removal of the transparent cover 24 from the mold.

In the clearance lamp 20 according to this embodiment, by forming the second light diffusive portion 31 on the first auxiliary light exit surface portion 24b, when looking at the clearance lamp 20 from a view point A lying above the clearance lamp 20 as shown in FIG. 3, it can be made difficult to see the fixing lance 32. By doing so, it is possible to increase the external appearance of the clearance lamp 20. Although the second light diffusive portion 31 needs to be formed at least on the periphery of a portion of the first auxiliary light exit surface portion 24b where the fixing lance 32 is provided to project, that is, on the thicker portion 40 and the periphery of the thicker portion 40, the second light diffusive portion 31 may be formed substantially over the whole area of the inner surface of the first auxiliary light exit surface portion 24b.

In this embodiment, as shown in FIG. 4, boundary lines 40a of the thicker portion 40 coincide with boundary lines 41a of the cylindrical steps 41 formed on the inner surface of the first auxiliary light exit surface portion 24b, and boundary lines 32b of the fixing lance 32 which projects from the thicker portion 40 coincide with boundary lines 42b of the cylindrical steps 42 formed on the inner surface of the thicker portion 40. By adopting this configuration, it is possible to make the thicker portion 40 and the fixing lance 32 less conspicuous.

In this embodiment described heretofore, the first light diffusive portion 30 formed on the main light exit surface portion 24a is made up of the plurality of steps arranged in a lattice manner, and the second light diffusive portion 31 formed on the first auxiliary light exit surface portion 24b is made up of the plurality of cylindrical steps. In this way, by configuring the first light diffusive portion 30 and the second light diffusive portion 31 so as to have the different shapes, the main light exit surface portion 24a and the first auxiliary light exit surface portion 24b are allowed to emit light differently, thereby making it possible to configure the vehicle lamp which looks novel. In addition, the main light exit surface portion 24a and the first auxiliary light exit surface portion 24b are allowed to emit light to achieve different objectives, thereby making it possible to allow a single lamp to have a plurality of functions.

An external surface of the first auxiliary light exit surface portion 24b may be subject to the surface texturing (so that the external surface is formed as a surface with minute irregularities (minute concavo-convex surface)). As this occurs, it can be made more difficult to see the fixing lance 32, thereby making it possible to increase the external appearance of the clearance lamp 20.

When the second auxiliary light exit surface portion 24c, which extends from a lower end portion of the main light exit surface portion 24a to the rear of the lamp, has a fixing lance, a light diffusive portion made up of a plurality of cylindrical steps may be formed also on an inner surface of the second auxiliary light exit surface portion 24c in a similar way to the way in which the light diffusive portions are formed on the first auxiliary light exit surface portion 24b. As this occurs, when the clearance lamp 20 is seen from a view point lying below the clearance lamp 20, it can be made difficult to see the fixing lance, and therefore, it is possible to increase the external appearance of the clearance lamp 20. Additionally, an external surface of the second auxiliary light exit surface 24c may also be subject to the surface texturing.

In the embodiment described above, while the LED is used as the light source of the clearance lamp 20, it is, of course, possible to use other light sources including a bulb. Additionally, there is imposed no specific limitation on the shape of the light guiding member 23, and therefore, light guiding members having various shapes can also be used.

In the embodiment described above, while the elongated light guiding member 23 is described as being used as the light emitting portion having the elongated shape, the light emitting portion having the elongated shape is not limited to the light guiding member, and therefore, for example, a form may be adopted in which a plurality of LEDs are aligned in a single or a plurality of rows.

In addition, in the embodiment, the transparent cover 24 is fixed to the clearance lamp body 26 by the claw portion 32a of the fixing lance 32 being brought into engagement with the engagement portion 34 formed on the clearance lamp body 26. However, the transparent cover 24 and the clearance lamp body 26 may be fixed together by fastening the fixing lance 32 to the clearance lamp body 26 with a screw or screws. In this case, by forming the second light diffusive portion 31 on the first auxiliary light exit surface portion 24b, it can be made difficult to see both the fixing lance 32 and the screws, thereby making it possible to increase the external appearance of the clearance lamp.

Additionally, in the embodiment, while the clearance lamp is described as being the example of the vehicle lamp, the invention can be applied not only to the clearance lamp but also to other vehicle lamps using an elongated light emitting portion.

Thus, the invention has been described based on the embodiment. The embodiment is just one example of the invention, and those skilled in the art can understand that various modified examples can be made by combining the constituent elements and the processes and that those modified examples also fall within the scope of the invention.

What is claimed is:

1. A vehicle lamp comprising:
   a light emitting portion having an elongated shape;
   a lamp body configured to accommodate therein the light emitting portion; and
   a transparent cover configured to cover an opening portion in the lamp body,
   wherein the transparent cover comprises:
      a main light exit surface portion positioned in front of the light emitting portion,
      an auxiliary light exit surface portion inclined with respect to the main light exit surface portion, the auxiliary light exit surface having a fixing portion configured to fix the transparent cover and the lamp body together, and
      a light diffusive portion formed on at least the periphery of a portion of the auxiliary light exit surface portion where the fixing portion is provided,
   wherein the light diffusive portion has a plurality of steps that are formed on an inner surface of the auxiliary light exit surface portion and extend in a front-rear direction of the lamp, and
   wherein the respective steps are aligned along an extending direction of the lamp that is perpendicular to the front-rear direction.

2. The vehicle lamp according to claim 1, wherein the transparent cover further comprises a light diffusive portion formed on the main light exit surface portion, and the light diffusive portion formed on the main light exit surface portion and the light diffusive portion formed on the auxiliary light exit surface portion have different shapes.

3. The vehicle lamp according to claim 1, wherein the vehicle lamp is a clearance lamp.

4. The vehicle lamp according to claim 1, wherein the plurality of steps are cylindrical steps.

5. The vehicle lamp according to claim 4, wherein the transparent cover further comprises a light diffusive portion formed on the main light exit surface portion, and the light diffusive portions on the main light exit surface portion have a plurality of steps arranged in a lattice manner.

6. The vehicle lamp according to claim 1, wherein a thicker portion that is thicker than other portions is formed at a part of the auxiliary light exit surface portion.

7. The vehicle lamp according to claim 6, wherein a boundary line of the thicker portion coincides with a boundary line of one of the steps formed on the inner surface of the auxiliary light exit surface portion.

8. The vehicle lamp according to claim 6, wherein a fixing lance extends from the thicker portion.

9. The vehicle lamp according to claim 8, wherein a boundary line of the fixing lance coincides with a boundary line of the step formed on the inner surface.

* * * * *